(12) United States Patent
Tofighi et al.

(10) Patent No.: US 10,638,092 B2
(45) Date of Patent: Apr. 28, 2020

(54) HYBRID CAMERA NETWORK FOR A SCALABLE OBSERVATION SYSTEM

(71) Applicant: KONICA MINOLTA LABORATORY U.S.A., INC., San Mateo, CA (US)

(72) Inventors: Ghassem Tofighi, Belmont, CA (US); Haisong Gu, Santa Clara, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 126 days.

(21) Appl. No.: 15/472,915

(22) Filed: Mar. 29, 2017

(65) Prior Publication Data

US 2017/0318264 A1  Nov. 2, 2017

Related U.S. Application Data

(60) Provisional application No. 62/316,193, filed on Mar. 31, 2016.

(51) Int. Cl.
*H04N 7/18* (2006.01)
*H04N 5/232* (2006.01)
(Continued)

(52) U.S. Cl.
CPC ......... *H04N 7/181* (2013.01); *G06K 9/00771* (2013.01); *G06K 9/209* (2013.01);
(Continued)

(58) Field of Classification Search
CPC .... G06K 9/3233; G06K 9/00771; G06T 7/11; H04N 5/23238; H04N 7/181
See application file for complete search history.

(56) References Cited

U.S. PATENT DOCUMENTS

| 7,015,954 B1 | 3/2006 | Foote et al. |
| 2007/0092245 A1* | 4/2007 | Bazakos ............ G06K 9/00255 396/427 |

(Continued)

FOREIGN PATENT DOCUMENTS

CN  102523370 A  6/2012

OTHER PUBLICATIONS

Trivedi et al.. "Dynamic context capture and distributed video arrays for intelligent spaces." IEEE Transactions on Systems, Man, and Cybernetics—Part A: Systems and Humans 35.1 (2005): 145-163 (Year: 2005).*

(Continued)

*Primary Examiner* — Fabio S Lima
(74) *Attorney, Agent, or Firm* — Buchanan Ingersoll & Rooney PC

(57) ABSTRACT

A method, a non-transitory computer readable medium, and a system are disclosed for observing one or more subjects. The method includes monitoring a space with at least one master sensor, wherein a plurality of secondary sensors are installed in the space, and wherein a number of the at least one master sensor is less than a number of the plurality of secondary sensors; detecting regions of interest based on input from the at least one master sensor; identifying one or more secondary sensors from the plurality of secondary sensors in the detected regions of interest; and recognizing activities in the detected regions of interest from the one or more secondary sensors.

20 Claims, 9 Drawing Sheets

(51) Int. Cl.
 *G06T 7/292* (2017.01)
 *G06K 9/00* (2006.01)
 *G06K 9/20* (2006.01)

(52) U.S. Cl.
 CPC ......... *G06T 7/292* (2017.01); *H04N 5/23238* (2013.01); *G06T 2207/10021* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 2010/0002071 | A1* | 1/2010 | Ahiska | H04N 5/217 348/36 |
| 2010/0002082 | A1* | 1/2010 | Buehler | G08B 13/19645 348/159 |
| 2010/0013931 | A1* | 1/2010 | Golan | G06K 9/00771 348/150 |
| 2011/0109748 | A1 | 5/2011 | Lee et al. | |
| 2011/0193966 | A1* | 8/2011 | Golan | H04N 7/181 348/159 |
| 2012/0069190 | A1* | 3/2012 | Nam | H04N 7/181 348/159 |
| 2013/0128050 | A1* | 5/2013 | Aghdasi | H04N 7/181 348/158 |
| 2014/0204019 | A1* | 7/2014 | Kihara | G06F 1/3231 345/156 |
| 2016/0173828 | A1* | 6/2016 | Kim | H04N 7/181 348/144 |
| 2017/0102863 | A1* | 4/2017 | Elliot | G06F 17/30572 |
| 2018/0152639 | A1* | 5/2018 | Li | H04N 5/23229 |

OTHER PUBLICATIONS

Ilhaddadene et al. "Real-time crowd motion analysis." Pattern Recognition, 2008. ICPR 2008. 19th International Conference on. IEEE, 2008 (Year: 2008).*

Munaro, M., Basso, F. and Menegatti, E., (2016). OpenPTrack: Open source multi-camera calibration and people tracking for RGB-D camera networks. Robotics and Autonomous Systems, 75, 525-538.

* cited by examiner

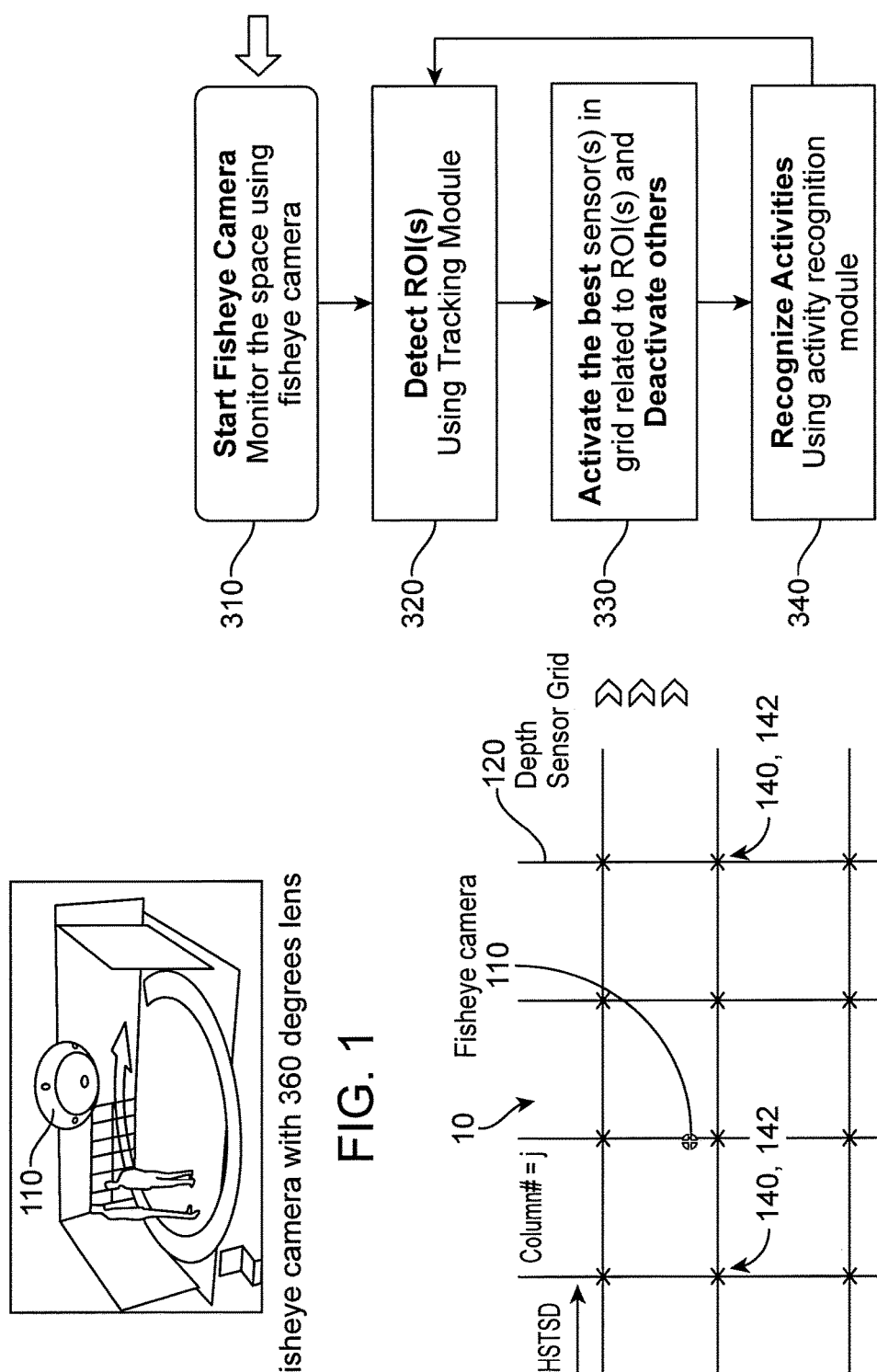

HFOV = Horizontal Field Of View (Degrees)
DOR = Depth Operation Range (Meter)

HYBRID CAMERA NETWORK FOR A SCALABLE OBSERVATION SYSTEM

CROSS-REFERENCES TO RELATED APPLICATIONS

This application claims priority to U.S. Provisional Patent Application Ser. No. 62/316,193, filed on Mar. 31, 2016, the entire content of which is incorporated herein by reference.

FIELD OF THE INVENTION

The present disclosure relates to a hybrid camera network configured to extend an observation system for any optional space size, and more particularly, to a method and system for activity recognition in a multilayer and distributed platform and which results in more efficient and accurate activity recognition, for example, in relatively large spaces.

BACKGROUND OF THE INVENTION

Because of the limitations of the range of operations of the sensors and cameras, research has been conducted to combine a network of cameras and sensors to observe an arbitrary large area. The goal of combining multiple camera and sensors can make a precise tracking and activity recognition in a scalable space. In most cases, the architecture of current camera networks may not be efficient because each of the sensors is activated (i.e., "ON") during an entirety of the operation time. Furthermore, in most of the approaches, a calibration step can be required so that cameras can communicate with each other with the same base reference.

For example, OpenPTrack is an open source project launched in 2013 to create a scalable, multi-camera solution for person tracking, which helps enable several people to be tracked over large areas in real time. The project is designed for applications in education, arts, and culture, as a starting point for exploring group interaction with digital environments.

Furthermore, for some applications of the camera network, a multi-camera video abnormal behavior detection method based on a network transmission algorithm is used. The method can include the following steps: blocking a scene of a multi-camera system, and constructing a network model by taking each sub-block as a node and the behavior relevance among the sub-blocks as a weight edge.

SUMMARY OF THE INVENTION

To address these issues, it would be desirable to have a hybrid camera network architecture, which includes a scalable observation system (SOS), and wherein the method and system can understand the varying mental or user states of each individual user or participant and an aggregated group state collocated as distributed, for example, in order to improve meeting quality.

In addition, in consideration of the above issues, it would be desirable to have a method and system for observing one or more subjects, which is scalable.

A method is disclosed for observing one or more subjects, the method comprising: monitoring a space with at least one master sensor, wherein a plurality of secondary sensors are installed in the space, and wherein a number of the at least one master sensor is less than a number of the plurality of secondary sensors; detecting regions of interest based on input from the at least one master sensor; identifying one or more secondary sensors from the plurality of secondary sensors in the detected regions of interest; and recognizing activities in the detected regions of interest from the one or more secondary sensors.

A non-transitory computer readable medium containing a computer program storing computer readable code for observing one or more subjects is disclosed, the program being executable by a computer to cause the computer to perform a process comprising: monitoring a space with at least one master sensor, wherein a plurality of secondary sensors are installed in the space, and wherein a number of the at least one master sensor is less than a number of the plurality of secondary sensors; detecting regions of interest based on input from the at least one master sensor; identify one or more secondary sensors from the plurality of secondary sensors in the detected regions of interest; and recognizing activities in the detected regions of interest from the one or more secondary sensors.

A system is disclosed for observing one or more subjects, the system comprising: at least one master sensor for monitoring a space; a plurality of secondary sensors installed in the space, wherein a number of the at least one master sensor is less than a number of the plurality of secondary sensors; and a processor configured to: detect regions of interest based on input from the at least one master sensor; identify the one or more secondary sensors from the plurality of secondary sensors in the detected regions of interest; and recognize activities in the detected regions of interest from the one or more secondary sensors.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is an illustration a fisheye camera with a 360-degree angle lens for a hybrid camera network for a scalable observation system in accordance with an exemplary embodiment.

FIG. 2 is an illustration of a fisheye camera on top of a camera network grid in accordance with an exemplary embodiment.

FIG. 3 is a flowchart of a system approach in accordance with an exemplary embodiment.

DETAILED DESCRIPTION

Figure 4:
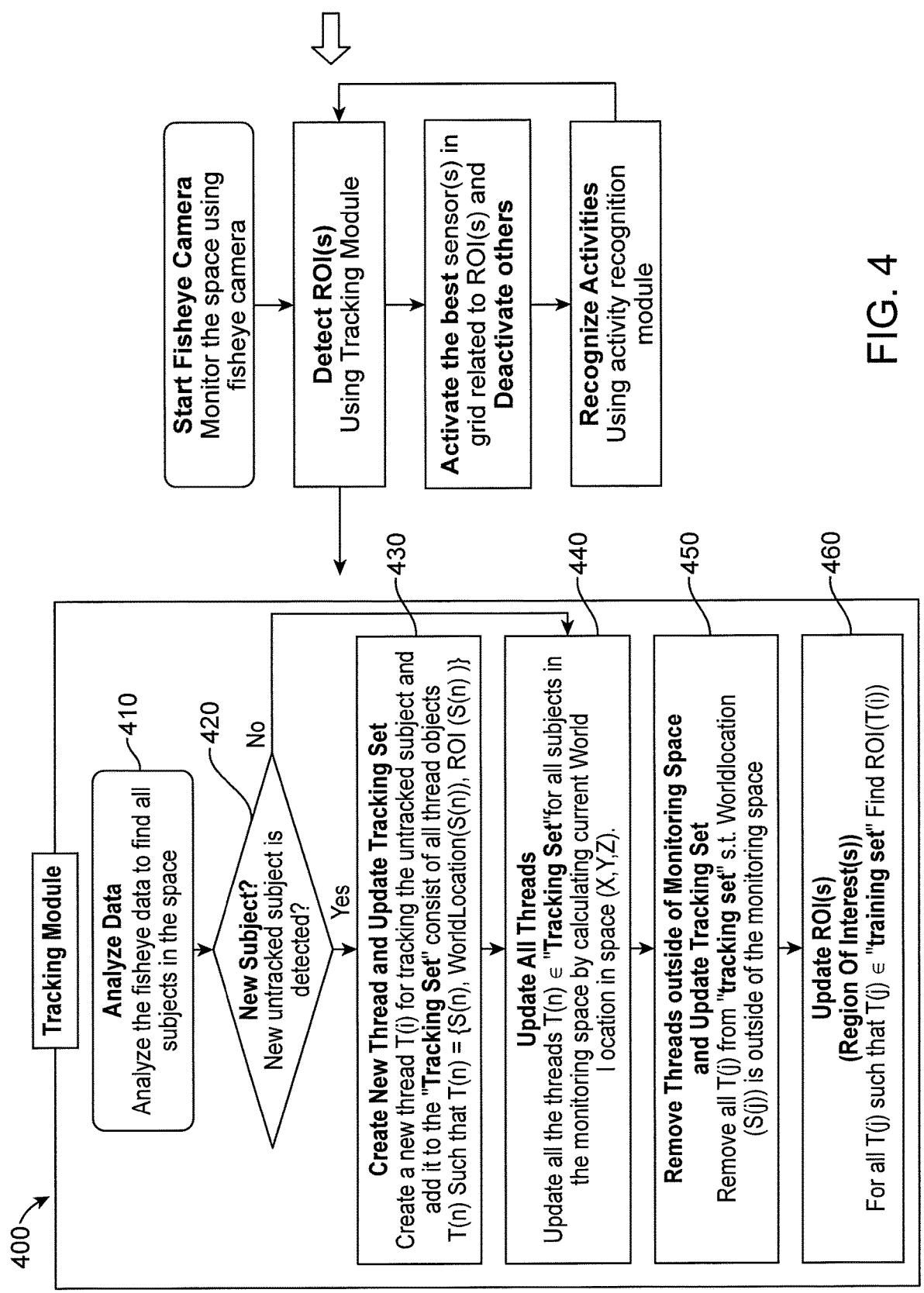
FIG. 4 is an illustration of a tracking module in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the hardware architecture for the methods and systems 100 disclosed herein, can consist of a master sensor 110 and sensor network 140, 142 as shown, for example, in FIGS. 1, 2, 5, 6, 8, 9, and 11-13. In accordance with an exemplary embodiment, the master sensor 110 can be configured and arranged to cover the whole (or entire) space, however, in the case where one master sensor 110 cannot cover the entire space using, for example, a single master sensor, one or more additional master sensors 110 can be used.

In accordance with an exemplary embodiment, for example, the master sensor 110 could be a center mounted fisheye (RGB/infrared) or a wall/corner mounted fisheye (RGB/infrared). In accordance with an exemplary embodiment, the master sensor 110 preferably has wide-angle lens that can view a wide panoramic or hemispherical view, for example, 360 degrees. However, the master sensor 110 can be configured to view less than 360 degrees. The sensor grid 120 can consist of several sensors 110, 140, 142, such as RGB, depth, infrared sensors, and/or motions sensors, which can be located in specified locations in the network. In accordance with an exemplary embodiment, the grid 120 can be a series of spaces 10 having a square or rectangular shape within the space 10 in which the at least one master sensor 110 can observe.

In accordance with an exemplary embodiment, each section of the sensor grid includes at least one sensor 140, 142. In addition, one or more sections of the grid can include two or more sensors 140, 142. Although the grid as shown is rectangular in nature, the grid 120 can be any shape and/or size as long as each section of the grid 120 includes at least one sensor 140, 142. Alternatively, one or more sections of the space 10 may not include any sensors, if the nature of the location does not necessitate at least one sensor and/or a sensor outside of the particular space 10 (or grid 120) can monitor that portion of the grid 120.

In accordance with an exemplary embodiment, the architecture of a scalable observation system 100 (SOS) consists of an omnidirectional sensor 110 such as a fisheye camera, for example, a master sensor, multiple sensors 140, 142, for example, network sensors in a network grid 120, and software modules, for example, a tracking module 400 and an activity recognition module 700. In accordance with an exemplary embodiment, the role of master sensor 110 is to provide data for the tracking module 400 to control network sensors 140, 142 dynamically based on the statistics of the whole environment and/or prior knowledge.

In accordance with an exemplary embodiment, the statistics of the environment can be updated during the operation time by observing and tracking movement of people and objects in the space 10 to identify regions of interests (ROI) 30. In accordance with an exemplary embodiment, the prior knowledge of the environment can include information such as door locations, working hours for the space 10, and object recognition by the master sensor 110. In the current disclosure, for example, the system 100 is illustrated with one master sensor 110. However, if the entirety of the space 10 is not observable by one omnidirectional sensor 110 because of obstacles, multiple master sensors 110 can be used which each controls a portion of the space 10 (or grid).

Figure 5:
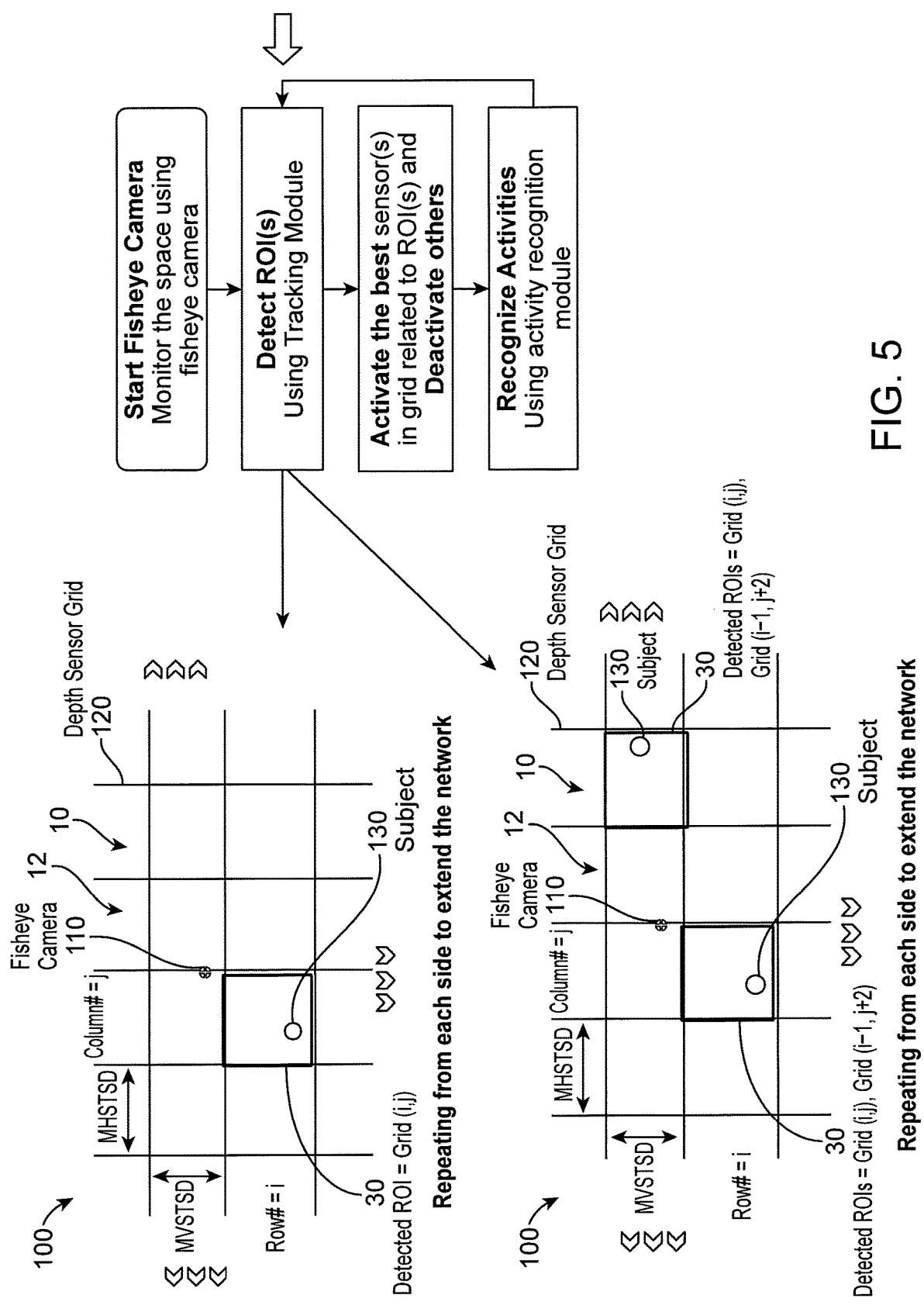
FIG. 5 is an illustration of a method and system of finding regions of interest (ROI(s)) in a tracking module in accordance with an exemplary embodiment.
Figure 6:
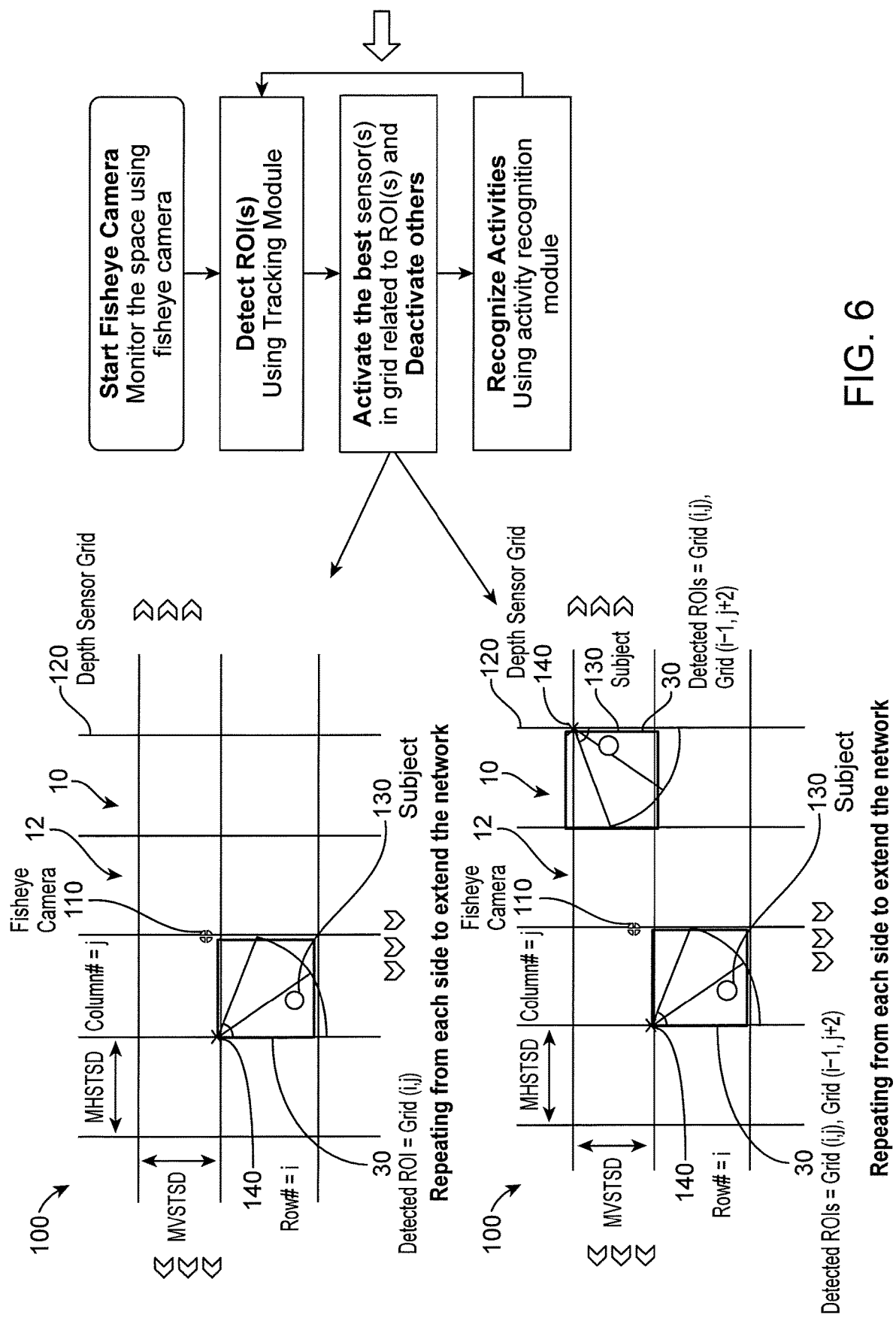
FIG. 6 is an illustration of a method and system of activating and deactivating sensors in regions of interest (ROI(s)) in accordance with an exemplary embodiment.
Figure 7:
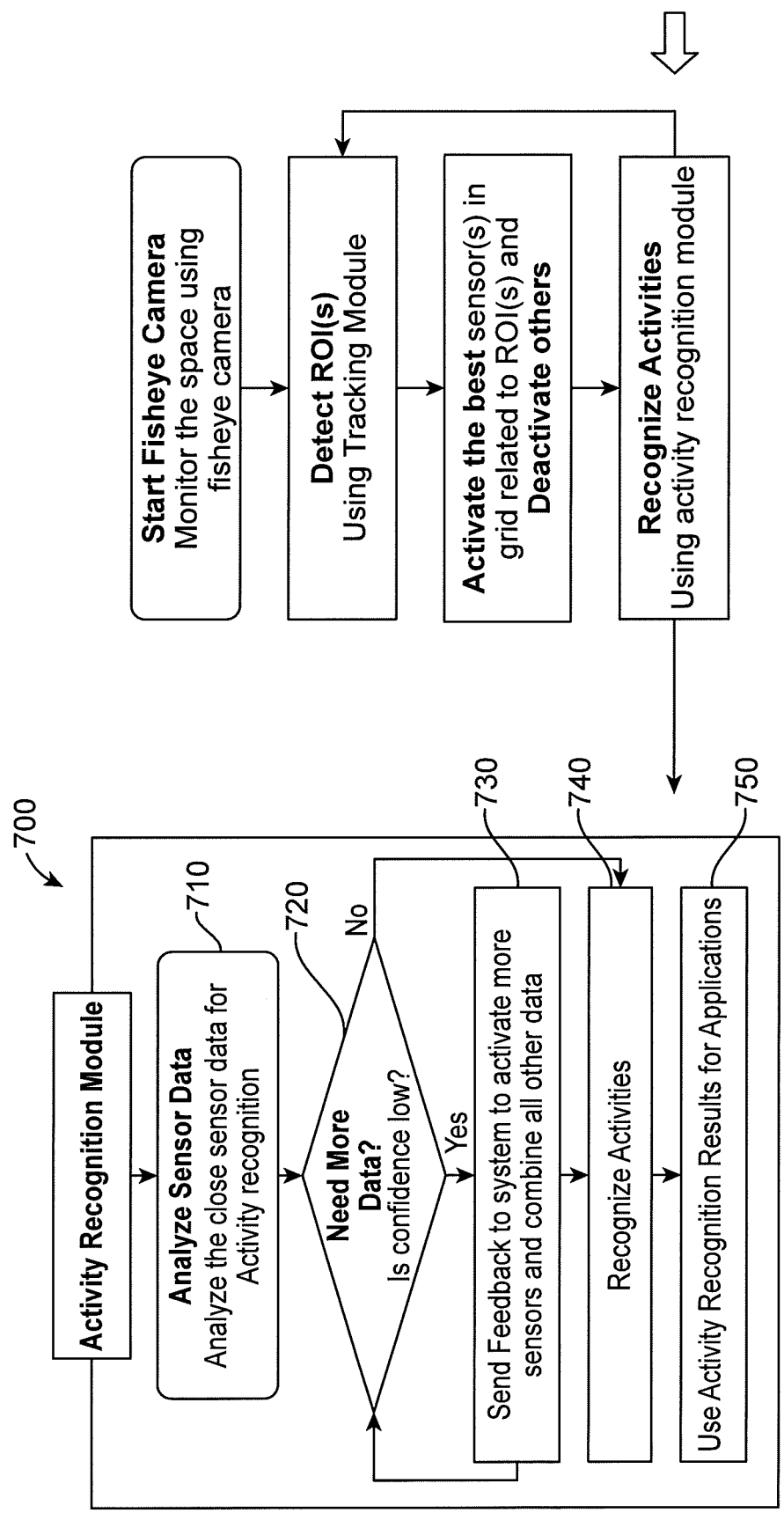
FIG. 7 is a flowchart showing a method and system for activity recognition in accordance with an exemplary embodiment.

In accordance with an exemplary embodiment, for example, as disclosed herein, network sensors 140, 142 refer to all other sensors in the network grid 120 that provide information for the activity recognition module 700 (FIG. 7). The network sensors 140, 142 can create, for example, a rectangular network grid 120, which divides the space 10 into a plurality of cells 12. As shown in FIG. 5, for example, each of the plurality of cells 12 in the grid 120, which are identified by the master sensor 110 and tracking module 400 (FIG. 4) as active cells can be identified as a region of interest (ROI) 30. In accordance with an exemplary embodiment, a region of interest 30 preferably includes at least one cell 12, however, one or more neighboring cells 12 can be considered as a region of interest 30. For example, in most cases each region of interest (ROI) 30 will be a single cell 12. In addition, two or more discreet or separate regions of interest (ROIs) 30 can be identified in a single space 10.

In accordance with an exemplary embodiment, the grid architecture can be based on the network sensor Horizontal Field Of View (HFOV) and other attributes of the sensor such as operation range. For example, for a depth sensor, the operation range of the sensor is called Depth Operation Range (DOR). For RGB cameras, for example, the operation range can be calculated as the distance that Activity Recognition Module has enough data to recognize the operation with high confidence.

In accordance with an exemplary embodiment, each cell 12, for example, can be monitored precisely by one or more network sensors 140, 142. The main task for each of the network sensors 140, 142, which are enabled or activated ("ON") or deactivated ("OFF") by the master sensor 110, can be based on precise activity recognition. In accordance with an exemplary embodiment, calibration methods can be used to calibrate the sensor network in the scalable observation system SOS 100, however a configuration with predefined locations of the sensors 140, 142 that can work in each cell 12 without calibration can also be used. In accordance with an exemplary embodiment, using a network grid 120, the calibration step for each cell 12 in the grid 120 can be eliminated as the set up can be predefined in the architecture. Furthermore, different sensors 140, 142 with different attributes can be used in the grid 120 with different calibration methods.

In accordance with an exemplary embodiment, a hybrid camera network is disclosed, which can extend the observation system for any optional space size. In the system, activity recognition occurs in a multilayer and distributed platform, which results in a relatively more efficient and accurate activity recognition in large spaces. This activity recognition system, for example, can be used for human-to-human and/or human-to-machine interaction, for example, in workplaces, offices, stores and the like.

In accordance with an exemplary embodiment, the system and method consists of the following parts: a comprehensive hybrid architecture for observing people and objects, dynamically identifying regions of interest (ROI) 30 in a scalable space, a multi-level and distributed Activity Recognition Architecture, and an understanding of people activity and interaction.

In accordance with an exemplary embodiment, the method and system 100 as disclosed herein, for example, can enable a system to track people movement in a large space; enable a system, which can evaluate user states such as anomaly, engagement, fatigue, or excitement in a large space; enable the activity recognition independent of location in the space; enable measurement from distance with ubiquitous sensors in the location; no wearable sensors are necessary; enable accurate user state evaluations based on universal principles without user effort; enable a detailed body posture component analysis; enable efficient sensor activation and deactivation for lower power consumption; and enable efficient utility management in the building based on active cells or regions of interest (ROI).

In accordance with an exemplary embodiment, the system and method as disclosed herein, can include dynamically detect regions of interest (ROI), and an activatable sensor group in the sensor network associated with the current detected ROI(s). The system and method can include, for example:

Online Tracking Module: Activation based on current detected ROI(s)

Offline Tracking Module (Tracking Statistics): Tracking Activation based on statistics results of human movement in space during a predetermined period (or time frame) and/or a certain period of time, which can incrementally make the system more efficient to activate and deactivate sensors based on the probability of presence of people in a space.

Prior Knowledge: Activation based on the prior knowledge of the environment, which can include information such as door locations, space working hours, and object recognition by the master sensor and the Tracking Module.

System Approach

FIGS. 1 and 2 are illustrations a hybrid camera network for scalable observation system 100 in accordance with an exemplary embodiment. As shown in FIGS. 1 and 2, the system 100 starts by capturing data from an omnidirectional sensor (or master sensor) 110 such as a fisheye camera. The fisheye camera 110, for example, with a 360-degree lens can provide information about the entirety of a space 10, and which information is used to form a depth sensor grid 120. In accordance with an exemplary embodiment, if the entire space 10 is not observable by one omnidirectional sensor 110 because of obstacles, two or more master sensors 110 that each controls a portion of the grid 120 in which the sensor 110 observes can be used.

In accordance with an exemplary embodiment, as shown in the system approach flowchart in FIG. 3, in step 310, the omnidirectional sensor (or fisheye camera) 110 monitors the space 10. In step 320, regions of interest (ROI(s)) 30 are detected using a tracking module as described herein. In step 330, once the ROI(s) 30 have been detected, sensors 140 in grids or cells 12 related to the ROI(s) 30 are identified and activated as shown in FIG. 2, and other sensors 142 (FIG. 9) can be deactivated. In step 340, activities within the grids or cells 12 or ROI(s) 30 can then be recognized using an activity recognition module 700 (FIG. 7).

Sensor Activation Based on Offline Tracking Module (Tracking Statistics)

In accordance with an exemplary embodiment, for example, the omnidirectional sensor 110 (or fisheye sensor) can generate statistics about tracking of people movement in a space 10 and create statistics such as a heat map (not shown) for highly frequented areas that shows those cells in the network grid that are more likely to be active during specified operation times to maintain those network sensors 140 active based on the repetitive patterns and to avoid overhead of activation and deactivation of those network sensors 140, which are likely to be active most of the time.

Sensor Activation Based on Prior Knowledge about Environment

In accordance with an exemplary embodiment, activation of the network system can be based on the prior knowledge of the environment, which can include information such as door locations, space working hours, and object recognition by the master sensor 110 and tracking module. This information can also help to identify the network sensors 140, which should be activated and/or the networks sensors 140, which are likely to be active most of the time.

Sensor Activation Based on Online Tracking Module

Using location information of the fisheye 110 and camera grid network location information, dynamically detect ROI(s) (Regions of interest) in the space using the tracking module can be obtained. As shown in the left flowchart in FIG. 4, the tracking module 400, in step 410 analyzes the fisheye data to find all subjects in the space. In step 420, a determination can be made, if a new subject is detected. If a new subject is detected in step 420, in step 430, a new thread (T(i)) is created for tracking the untracked subject and the subject is added to the "Tracking Set" consisting of all threaded objects (T(n)), such that T(n)={S(n), WorldLocation (S(n)), ROI (S(N))}.

In accordance with an exemplary embodiment, if no new subjects are detected, the process continues to step 440. In step 440, all the threads T(n) ∈ "Tracking Set" for all subjects in the monitoring space are updated by calculating current WorldLocation in space (X, Y, Z). In step 450, all T(i) which are outside of the monitoring space are removed and an updated tracking set is obtained, i.e., remove all T(i) from "Tracking Set" s.t., WorldLocation (S)(i) is outside of the monitoring space. In step 460, regions of interest (ROI(s)) are updated for all T(i) such that T(i) ∈ "Tracking Set", and find ROI (T(i)).

In accordance with an exemplary embodiment, the tracking module 400 can help the system find regions of interest (ROI(s)) 30 as shown, for example, in FIGS. 5-8. As shown in FIG. 5, for example, the master sensor (or fisheye camera) 110 can detect the ROI(s) 30 by identifying, for example, one or more subjects 130 within the space 10 and identifying one or more grids (or cells) 12 for each of the one and more subjects 130. Afterwards, based on the detected ROI(s) 30, the system 100 can identify and activate, for example, the closest sensor(s) 140 (i.e., best sensor(s)) to the detected subject(s) 130 and all other sensors 142 can be deactivated (FIG. 9).

In accordance with an exemplary embodiment, at this stage of the system, the activity recognition module 700 (FIG. 7) recognizes activities, which are performed in the ROI(s) 30. As shown in FIG. 7, the activity recognition module in step 710 analyzes the closest sensor data for activity recognition. In step 720, a determination can be made if more data is needed if, for example, the confidence level is low. If more data is needed, in step 730, feedback can be sent to the system to activate more sensors 140 and combine all other data. If more data is not needed, the process continues to step 740 where activities are recognized. In step 750, the activity recognition results can be used for applications as described herein.

Figure 8:
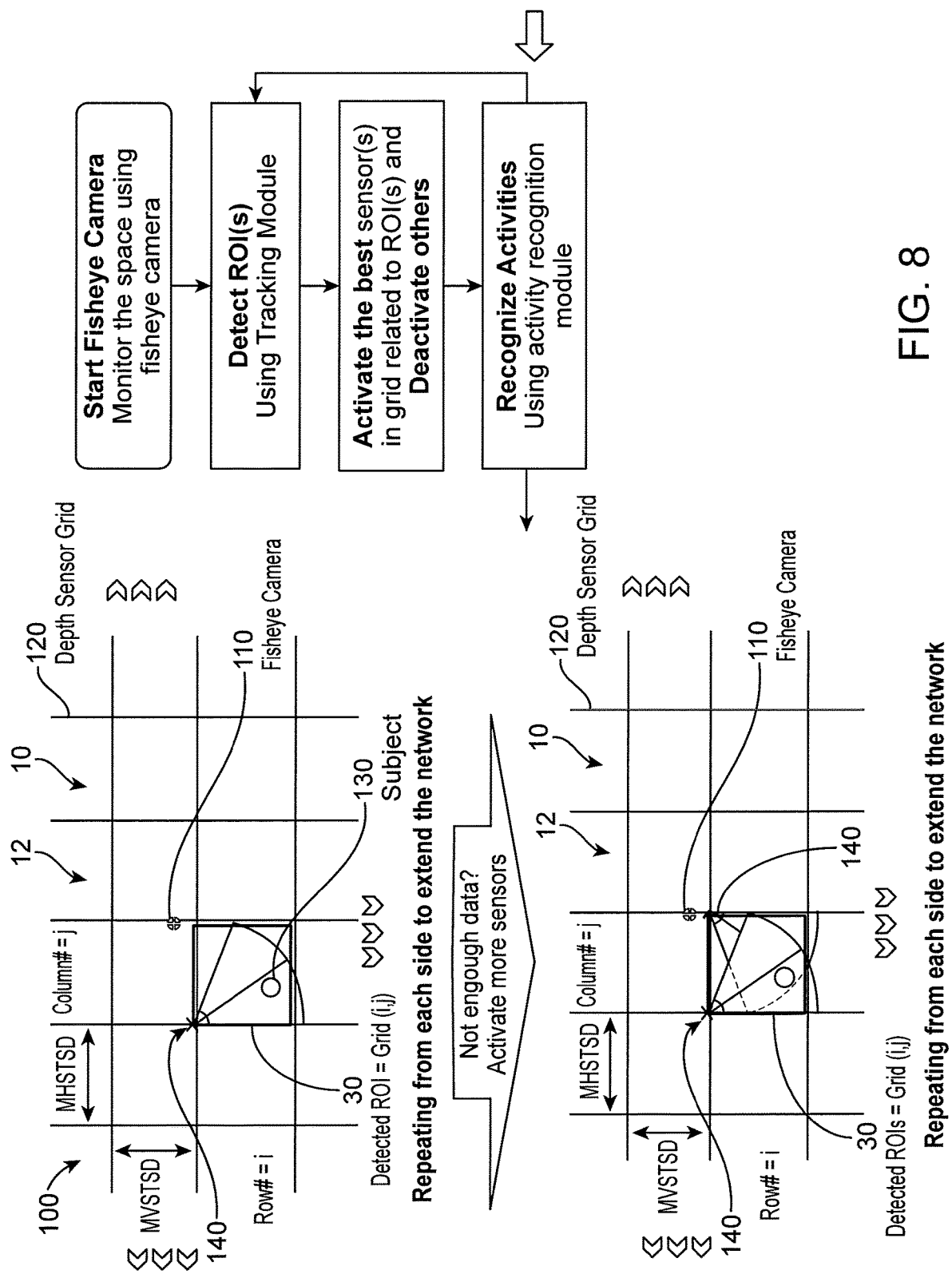
FIG. 8 is an illustration of a method of providing feedback to the system for increased sensor activation in accordance with an exemplary embodiment.
Figure 9:
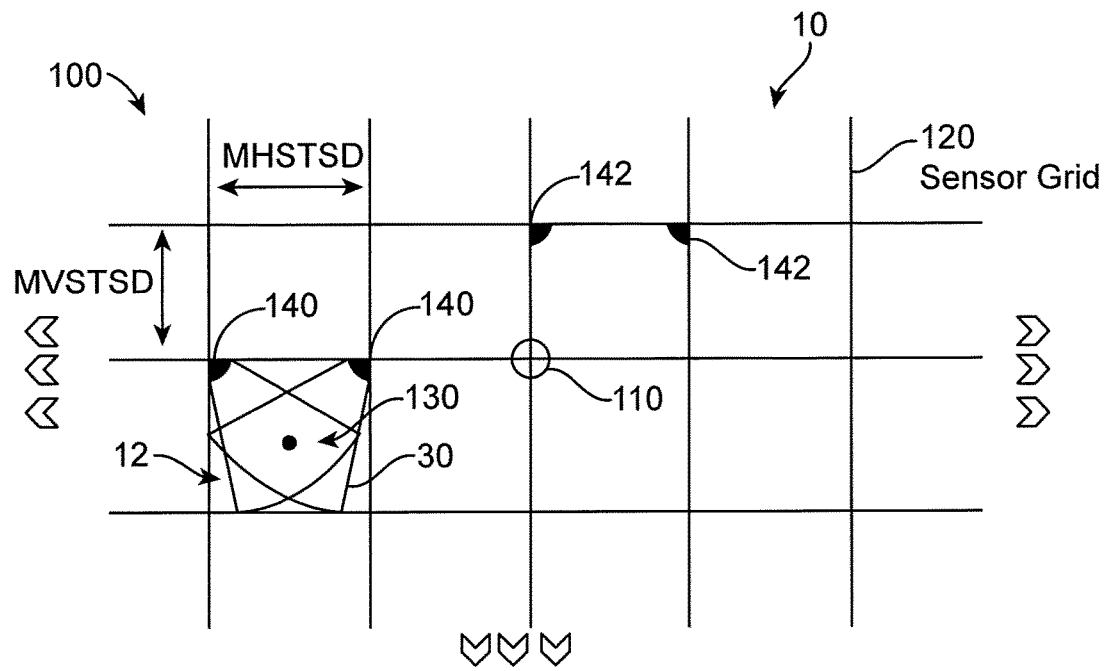
FIG. 9 is an illustration of a sensor grid in accordance with an exemplary embodiment.

In accordance with an exemplary embodiment, if the activity recognition module 700 needs more data, the activity recognition module 700 can send feedback to the system to activate one or more sensors 140 for better activity recognition (FIG. 8).

Sensor Network Architecture

In accordance with an exemplary embodiment, the system and method as disclosed herein can be configured such that the best sensor or sensors 140 (i.e., for example, closest sensors) for activity recognition can be identified and activated. Several architectures for this purpose can be used including, for example, existing sensor networks. For example, the sensor network can include two-dimensional (2D) RGB cameras or three-dimensional (3D) depth sensors, infrared cameras or any combinations of cameras and/or sensors. The sensors 140, 142 can include, for example, motion detectors, Infrared sensors, thermal sensors, radar-type sensors, and/or vision based sensors.

In accordance with an exemplary embodiment, a special case of sensor network can be presented that can optionally eliminate the calibration step in a sensor network. However, in accordance with another exemplary embodiment, the general architecture of the method and system as disclosed herein can use a calibration step to help improve the results and/or obtain results that are more precise.

In the following network grid architecture, an embedded system is disclosed that uses systems, such as NVIDIA® Jetson TK1/TX1, or a similar hardware comes with the sensor(s) in the case the sensor does not provide its own embedded system for transforming observed data through the network. Furthermore, in accordance with an exemplary embodiment, a server (FIG. 10) can be used to send and receive information and commands from the sensors in a client-server platform.

FIG. 9 is an illustration of a system 100 for observing one or more subjects 130 in a sensor grid 120 in accordance with an exemplary embodiment. As shown in FIG. 9, the system 100 can include at least one master sensor 110, for example, a fisheye camera, and two or more secondary sensors 140. For example, the number of the at least one master sensor 110 will preferably be less than the number of the two or more secondary sensors 140. In accordance with an exemplary embodiment, the tracking module 400 (FIG. 4) is configured to carry out the operations performed by the at least one master sensor 110 including the detection and determination of those regions of interest 30 (FIGS. 6 and 8) in the space 10.

Figure 10:
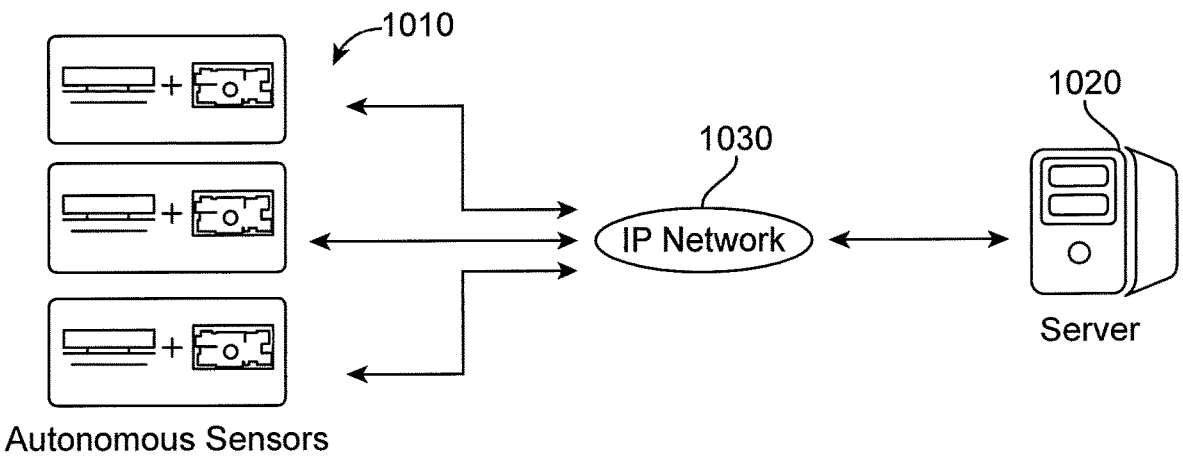
FIG. 10 is an illustration of an autonomous sensor network architecture in accordance with an exemplary embodiment.

In accordance with an exemplary embodiment as shown in FIG. 9, the two or more secondary sensors 140 are located in the detected regions of interest (ROIs) 30. In accordance with an exemplary embodiment, the space 10, which is monitored by the at least one master sensor 110 can be divided into a grid 120 having a plurality of cells 12, and wherein each cell 12 in the grid 120 can be addressed by index (i, j) in two dimensions. In accordance with an exemplary embodiment, the activity recognition module 700 is configured to carry out the operations performed by the two or more secondary sensors 140. In the grid 120 as shown in FIG. 9, two main parameters can be defined as:

MHSTSD=Maximum Horizontal Sensor To Sensor Distance
 For full coverage, sensors should be placed horizontally at maximum distance of MHSTSD
MVSTSD=Maximum Vertical Sensor To Sensor Distance
 For full coverage, sensors should be placed vertically at maximum distance of MVSTSD Autonomous Depth Sensor Network Architecture In accordance with an exemplary embodiment, in this architecture, all sensors 1010, which are preferably a master sensor 110, or secondary sensors 140, 1420, can include an embedded system, and which can transfer information to the main server 1020, for example, via an IP network 1030. FIG. 10 illustrates an example of a plurality of autonomous sensors 1010 in this architecture, and wherein each autonomous sensor 1010 can be equipped with an embedded system, which can perform activity recognition processing. In this architecture, each autonomous sensor 1010 in the grid performs all activity recognition on its own embedded hardware and transfers all necessary information such as video stream and recognized activity to the server 1020. The server 1020 can be configured to analyze all data and perform suitable action regarding the observed activity. The server 1020 may combine several autonomous data to create and extract features that are more accurate. For example, the server 1020 may combine two or more video streams coming from each autonomous sensor 1010 for 3D reconstruction of the scene for further analysis. For example, in accordance with an exemplary embodiment, each autonomous sensor 1010 communicates with the server 1020 via a network connection, for example, an IP network 1030.

The server 1020 can include a processor or central processing unit (CPU) and one or more memories for storing software programs and data. The processor or CPU carries out the instructions of a computer program, which operates and/or controls at least a portion of the functionality of the server 1020. The server 1020 can also include an input unit, a display unit or graphical user interface (GUI), and a network interface (I/F), which is connected to the network communication (or network) 1030. The server 1020 can also include an operating system (OS), which manages the computer hardware and provides common services for efficient execution of various software programs.

In the abovementioned exemplary embodiment, the sensors 1010 that are associated with the ROIs are identified and activated, thereby the server 1020 can concentrate on the activities occurred in the ROIs; however, the present invention is not limited to this specific embodiment. For example, each of the sensors 1010 may always be activated regardless of the sensors 1010 being associated with ROIs 30 and configured to be continuously sending data to the server 1020, while the server 1020 may identify the sensors 1010 associated with the ROIs 30 and ignore the data from the sensors 1010 not associated with the ROIs 30 so as to use only the data from the identified sensors 1010 that are associated with the ROIs 30. Although this alternative embodiment does not contribute to reduce unnecessary electric consumption by the sensors 1010, it can still be beneficial because the server 1020 does not need to spare its computational power to useless data from the areas out of ROIs. For example, in accordance with an exemplary embodiment, this alternative embodiment can be preferable in case where the sensors 1010 are shared with another server (not shown) and are configured to be activated for by the another server for a different use or usage.

In accordance with an exemplary embodiment, for example, the network communication 1030 can be a public telecommunication line and/or a network (for example, LAN or WAN). Examples of the network communication 1030 can include any telecommunication line and/or network consistent with embodiments of the disclosure including, but are not limited to, telecommunication or telephone lines, the Internet, an intranet, a local area network (LAN), a wide area network (WAN) and/or a wireless connection using radio frequency (RF) and/or infrared (IR) transmission.

In accordance with an exemplary embodiment, for example, the tracking module 400 and the activity recognition module 700 can be combined in one computer device, for example, a standalone computer, or can be contained within one or more computer devices, wherein each of the one or more computer devices has a memory, a processor, an operating system and/or software, and a graphical user interface (GUI) or display. In accordance with an exemplary embodiment, for example, biometric information such as skeleton joint 3D locations, RGB, and depth information can be transferred over a communication network to be analyzed in a distributed platform.

Figure 11:
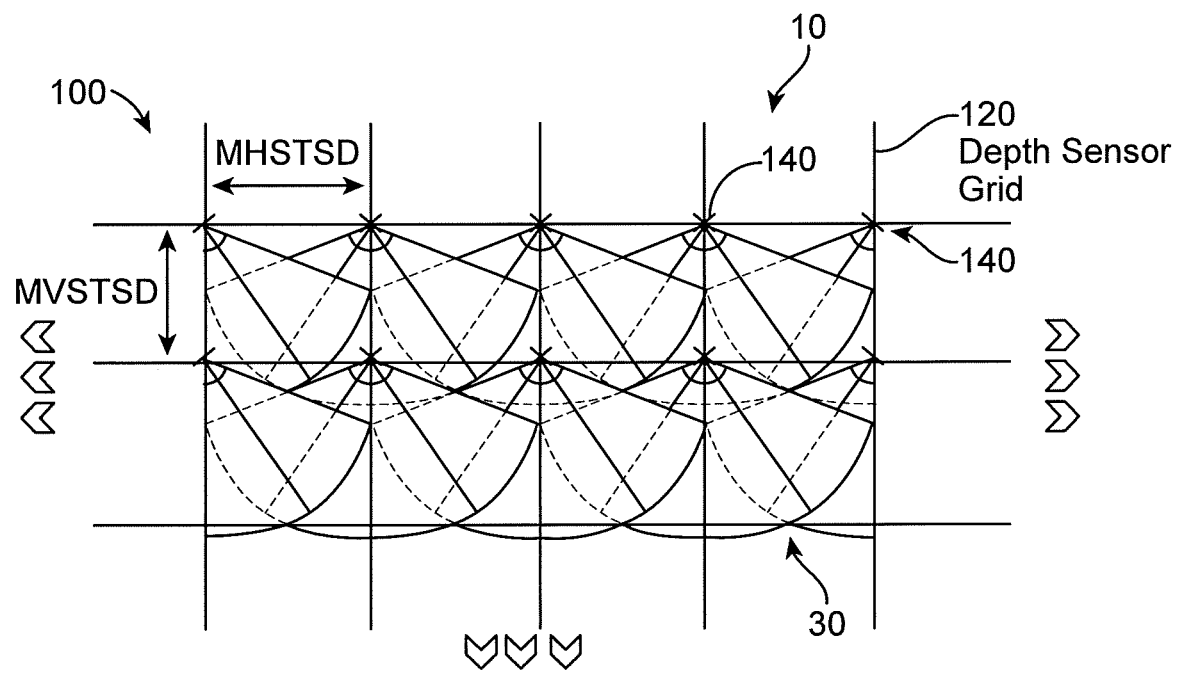
FIG. 11 is an illustration of a depth sensor network in accordance with an exemplary embodiment.
Figure 12:
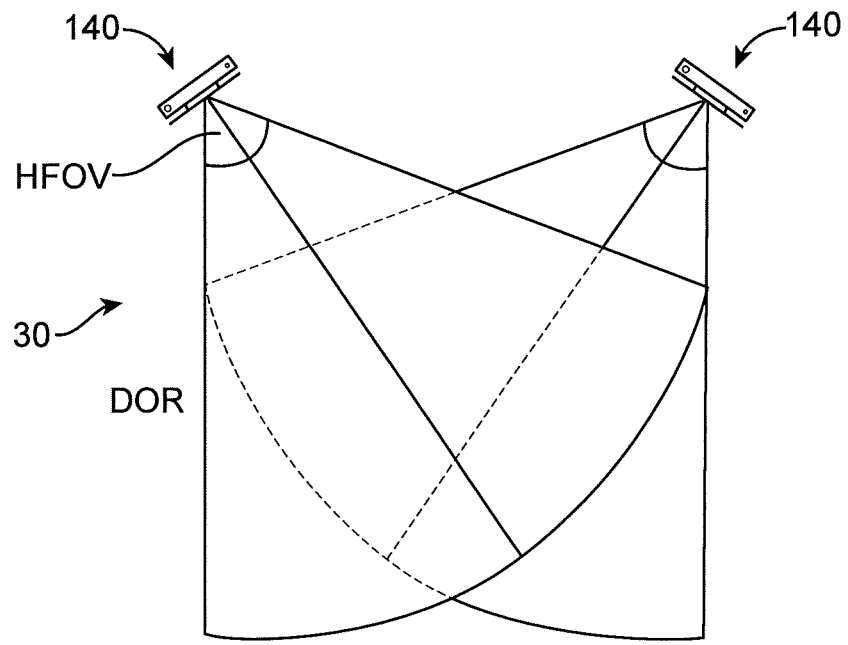
FIG. 12 is an illustration of a camera network building block in accordance with an exemplary embodiment.

FIG. 11 is an illustration of a depth sensor network in accordance with an exemplary embodiment and illustrates an arrangement of sensors (in this case, for example, a depth sensor network (120)). In accordance with an exemplary embodiment, the pie segment in front of each sensor 140 shows the operation range of that sensor which has a Horizontal Field Of View (HFOV) and a Depth Operation Range (DOR) as shown in FIG. 12.

Figure 13:
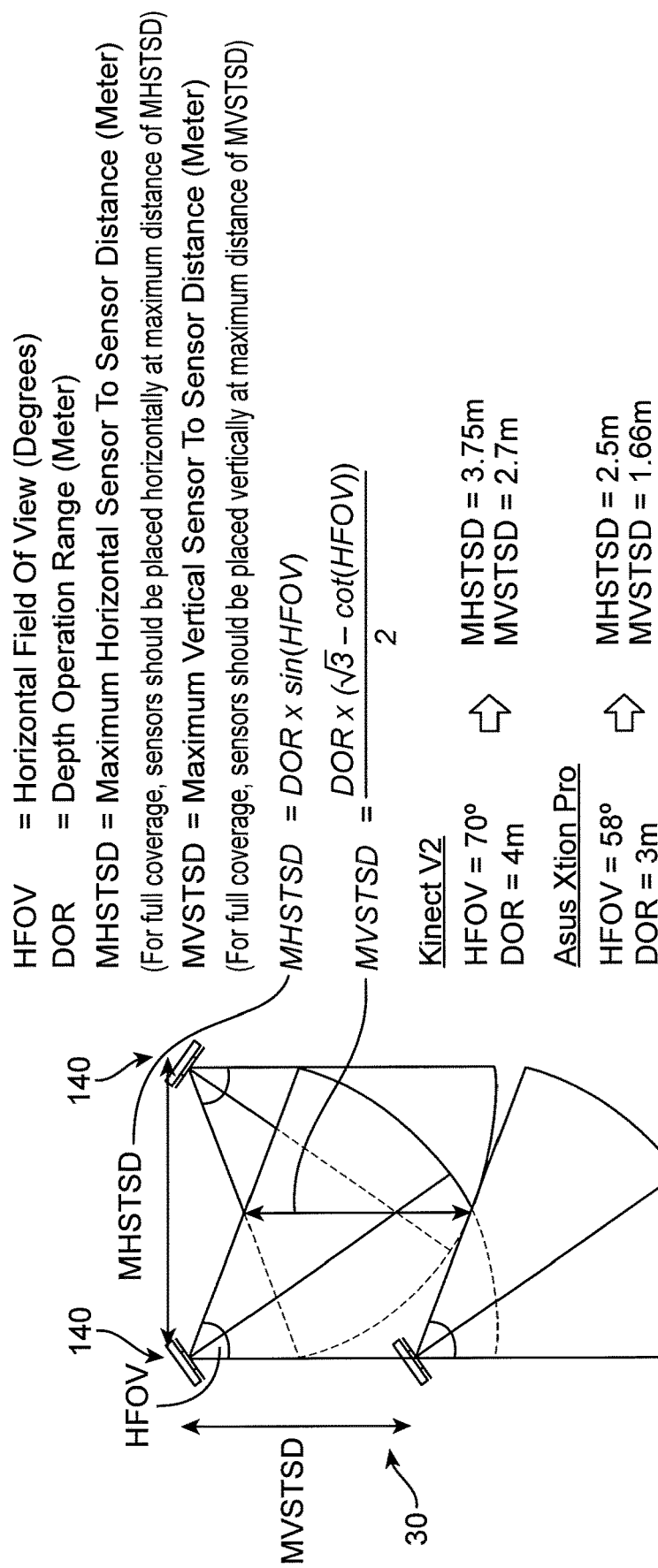
FIG. 13 is an illustration of architecture parameters based on sensor specifications in accordance with an exemplary embodiment.

FIG. 13 illustrates architecture parameters for the network based on sensor specifications. For example, FIG. 13 illustrates for full coverage of the space, the maximum distances between sensors vertically and horizontally, which are needed. For example, for Kinect V2 with HFOV of 70° and DOR of 4 meters, the MHSTSD can be about 3.75 meters and the MVSTSD can be about 2.7 meters for full coverage. In addition, the sensor is facing HFOV/2 from vertical lines in the grid.

Activity Recognition Approach

In accordance with an exemplary embodiment, for activity recognition system, biometric features of the subjects 130 (i.e., people) such as body gestures and voice who are in the scalable observation system (SOS) can be used. In accordance with an exemplary embodiment, for example, the sensor network can be extended with more biometric sensors for feature extraction in one or more locations in the SOS 100. In addition, the concepts provided for a vision-based system can be extendible to other types of sensors. In the case of nonverbal activity recognition based on visual data, for example, several sensor network architectures based on 2D and 3D visual approach and combination of them can be presented.

Applications

Knowing the location and orientation of people or objects moving through the space has many advantages and applications. For example, this information can improve systems for activity recognition, building, and utility management.

Activity Recognition

In accordance with an exemplary embodiment, the system and method disclosed herein can be used to track people and use biometric information of people for activity recognition. For example, nonverbal behavior analysis can give clues about human-to-human and human to being able to detect gesture and posture or the subconscious changes in the body language can provide informative data for any kind of activity recognition.

In accordance with an exemplary embodiment, the following examples illustrate some of the use cases of Activity Recognition in SOS:

Individual user state evaluation, for example, the system can take multi-modal user information to evaluate a hidden user state;

Enables a detailed body posture component analysis;

Group state evaluation, for example, the system can take the individual user state and can create a group state evaluation reflecting on the group dynamic and activity; and Far-range distance Activity Recognition, for example, the system allows for multiple users to naturally interact in far ranges of the sensor and thereby allows for various room configurations with any size.

Environmental Feedback and Utility Management

In accordance with an exemplary embodiment, an environmental feedback can be send to equipment, for example, heating and cooling units within the space based on the detected activities. For example, heaters, air conditioners, or lights can be activated in the active cells or detected ROIs 30 based on the tracking and activity recognition module. Using this information, for example, one can utilize environment equipment locally and more efficiently based on their operation range and ROI.

In accordance with an exemplary embodiment, a non-transitory computer readable medium containing a computer program storing computer readable code for observing one or more subjects is disclosed, the program being executable by a computer to cause the computer to perform a process comprising: monitoring a space with at least one master sensor, wherein a plurality of secondary sensors are installed in the space, and wherein a number of the at least one master sensor is less than a number of the plurality of secondary sensors; detecting regions of interest based on input from the at least one master sensor; identifying one or more secondary sensors from the plurality of secondary sensors in the detected regions of interest; and recognizing activities in the detected regions of interest from the one or more secondary sensors.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for observing one or more subjects, the method comprising:

monitoring a space with at least one master sensor, wherein a plurality of secondary sensors are installed in the space, and wherein a number of the at least one master sensor is less than a number of the plurality of secondary sensors;

dividing the space into a grid architecture, the grid architecture having a plurality of cells, each of the cells having two or more secondary sensors, and wherein the grid architecture is based on a horizontal field of view and other attributes of each of the two or more secondary sensors;

detecting regions of interest based on input from the at least one master sensor and one or more of statistical results of movement in the space during a predetermined period of time or time frame and prior knowledge of an environment within the space;

assigning the detected regions of interest to one or more of the cells, and activating the two or more secondary sensors in each of the cells within the detected regions of interest, and wherein the two or more activated secondary sensors are configured to fully cover and monitor the detected regions of interest;

identifying the two or more activated secondary sensors from the plurality of secondary sensors in the detected regions of interest; and recognizing activities in the detected regions of interest from the two or more activated secondary sensors.

2. The method of claim 1, wherein the detecting of regions of interest comprises:

detecting one or more subjects in the space based on the input from the master sensor and the one or more of the statistical results of movement in the space during the predetermined period of time or time frame and the prior knowledge of the environment within the space;

tracking each of the one or more subjects in the space by calculating a current location;

updating the current location of each of the one or more subjects; and updating the detected regions of interest based on the updated current location of each of the one or more subjects.

3. The method of claim 1, comprising:
activating all of the plurality of secondary sensors; and
analyzing data only from the two or more activated secondary sensors in the detected regions of interest.

4. The method of claim 1, comprising:
deactivating secondary sensors of the plurality of secondary sensors in each of the cells, which are not regions of interest.

5. The method of claim 1, comprising:
analyzing data from the two or more activated secondary sensors for activity recognition; and
identifying one or more additional secondary sensors of the plurality of secondary sensors if additional data is needed for the activity recognition.

6. The method of claim 1, comprising:
applying the activity recognition to one or more applications, the one or more applications include monitoring of one or more subjects within the space, and/or environmental feedback including heating and cooling of the space.

7. The method of claim 1, comprising:
generating a heat map of activity within the space; and
detecting the regions of interest based on the heat map.

8. The method of claim 1, wherein each of secondary sensors has a horizontal field of range and a depth of operation range, the method further comprising:
arranging the secondary sensors in a horizontal arrangement and a vertical arrangement, and wherein the secondary sensors are each arranged at a distance not to exceed a maximum horizontal sensor to sensor distance and a maximum vertical sensor to sensor distance.

9. A non-transitory computer readable medium containing a computer program storing computer readable code for observing one or more subjects, the program being executable by a computer to cause the computer to perform a process comprising:

monitoring a space with at least one master sensor, wherein a plurality of secondary sensors are installed in the space, and wherein a number of the at least one master sensor is less than a number of the plurality of secondary sensors;

dividing the space into a grid architecture, the grid architecture having a plurality of cells, each of the cells having two or more secondary sensors, and wherein the grid architecture is based on a horizontal field of view and other attributes of each of the two or more secondary sensors;

detecting regions of interest based on input from the at least one master sensor and one or more of statistical results of movement in the space during a predetermined period of time or time frame and prior knowledge of an environment within the space;

assigning the detected regions of interest to one or more of the cells, and activating the two or more secondary sensors in each of the cells within the detected regions of interest, and wherein the two or more activated secondary sensors are configured to fully cover and monitor the detected regions of interest;

identifying the two or more activated secondary sensors from the plurality of secondary sensors in the detected regions of interest; and recognizing activities in the detected regions of interest from the two or more activated secondary sensors.

10. The non-transitory computer readable medium of claim 9, wherein the detecting of regions of interest comprises:

detecting subjects in the space based on the input from the master sensor and the one or more of the statistical results of movement in the space during a predetermined period of time or time frame and the prior knowledge of the environment within the space;

tracking each of the one or more subjects in the space by calculating a current location;

updating the current location of each of the one or more subjects; and updating the detected regions of interest based on the updated current location of each of the one or more subjects.

11. The non-transitory computer readable medium of claim 9, comprising:
activating all of the plurality of secondary sensors; and
analyzing data only from the two or more activated secondary sensors in the detected regions of interest.

12. The non-transitory computer readable medium of claim 9, comprising:
deactivating secondary sensors of the plurality of secondary sensors in each of the cells, which are not regions of interest.

13. The non-transitory computer readable medium of claim 9, comprising:
analyzing data from the two or more activated secondary sensors for activity recognition; and
identifying one or more additional secondary sensors of the plurality of secondary sensors if additional data is needed for the activity recognition.

14. The non-transitory computer readable medium of claim 9, wherein each of the secondary sensors have a horizontal field of range and a depth of operation range, the process further comprising:
arranging the secondary sensors in a horizontal arrangement and a vertical arrangement, and wherein the secondary sensors are each arranged at a distance not to exceed a maximum horizontal sensor to sensor distance and a maximum vertical sensor to sensor distance.

15. A system for observing one or more subjects, the system comprising:
at least one master sensor for monitoring a space;
a plurality of secondary sensors installed in the space, wherein a number of the at least one master sensor is less than a number of the plurality of secondary sensors; and
a processor configured to:
divide the space into a grid architecture, the grid architecture having a plurality of cells, each of the cells having two or more secondary sensors, and wherein the grid architecture is based on a horizontal field of view and other attributes of each of the two or more secondary sensors;
detect regions of interest based on input from the at least one master sensor and one or more of statistical results of movement in the space during a predetermined period of time or time frame and prior knowledge of an environment within the space;
assign the detected regions of interest to one or more of the cells, and activating the two or more secondary sensors in each of the cells within the detected regions of interest, and wherein the two or more activated secondary sensors are configured to fully cover and monitor the detected regions of interest;
identify the two or more activated secondary sensors from the plurality of secondary sensors in the detected regions of interest; and
recognize activities in the detected regions of interest from the two or more activated secondary sensors.

16. The system of claim 15, wherein the detecting of regions of interest comprises:
detecting one or more subjects in the space based on the input from the master sensor and the one or more of the statistical results of movement in the space during a predetermined period of time or time frame and the prior knowledge of the environment within the space;
tracking each of the one or more subjects in the space by calculating a current location;
updating the current location of each of the one or more subjects; and
updating the detected regions of interest based on the updated current location of each of the one or more subjects.

17. The system of claim 15, wherein all of the plurality of secondary sensors are activated; and
the processor is configured to:
analyze data only from the two or more activated secondary sensors in the detected regions of interest.

18. The system of claim 15, wherein the processor is configured to:
deactivate secondary sensors of the plurality of secondary sensors in each of the cells, which are not regions of interest.

19. The system of claim 15, wherein the processor is configured to:
analyze data from the two or more activated secondary sensors for activity recognition;
identify one or more additional secondary sensors if additional data is needed for the activity recognition; and
apply the activity recognition to one or more applications, the one or more applications including monitoring of one or more subjects within the space, and/or environmental feedback including heating and cooling of the space.

20. The system of claim 15, wherein each of the two or more activated secondary sensors have a horizontal field of range and a depth of operation range, the secondary sensors being arranged in a horizontal arrangement and a vertical arrangement, and wherein the secondary sensors are each arranged at a distance not to exceed a maximum horizontal sensor to sensor distance and a maximum vertical sensor to sensor distance.

* * * * *